March 16, 1937.  A. W. BRAUN  2,074,251
ARRANGEMENT FOR THE AUTOMATIC STEERING OF MOTOR VEHICLES
Filed Jan. 8, 1936  2 Sheets-Sheet 1

A. W. Braun
Inventor
By Glascock Downing & Seebold
Attys.

March 16, 1937.   A. W. BRAUN   2,074,251
ARRANGEMENT FOR THE AUTOMATIC STEERING OF MOTOR VEHICLES
Filed Jan. 8, 1936   2 Sheets-Sheet 2
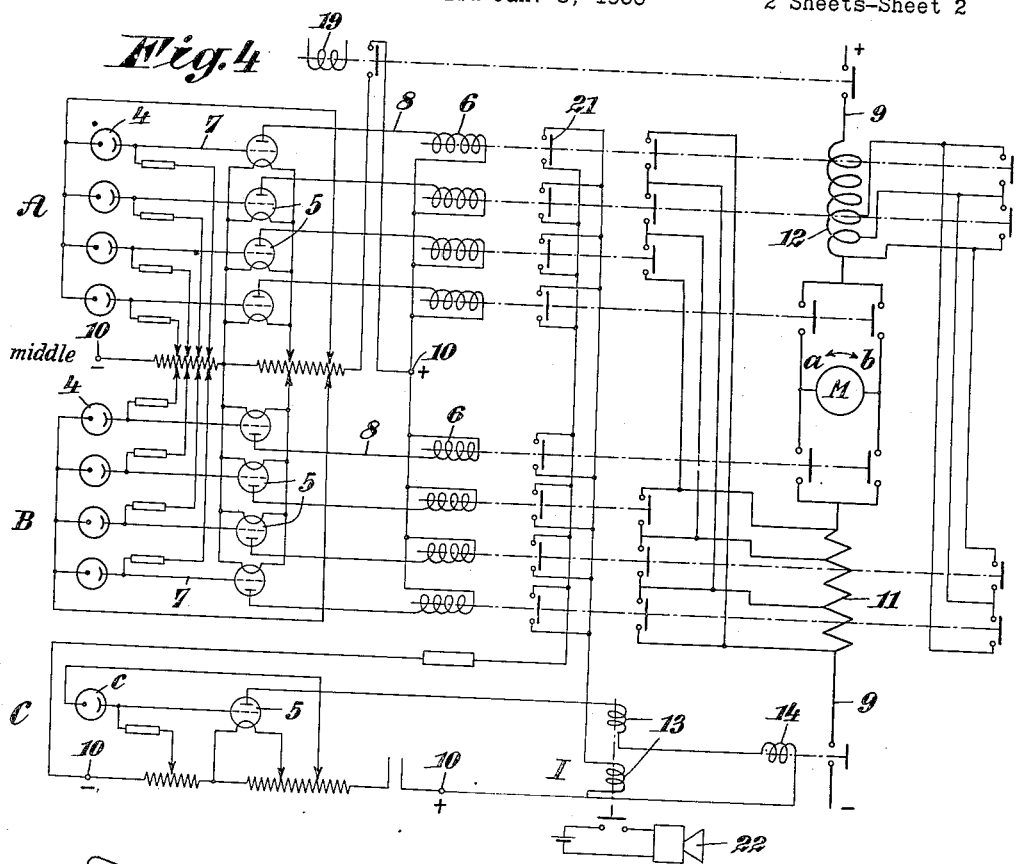
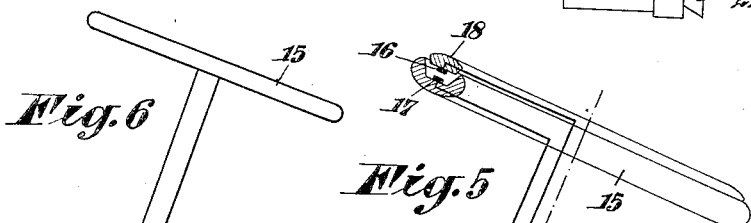
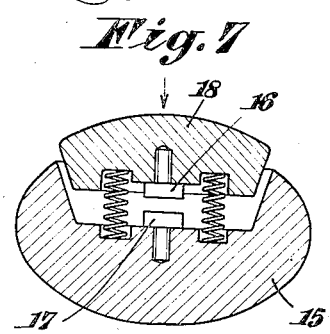
A. W. Braun
INVENTOR
By Glascock Downing & Seebold
Attys.

Patented Mar. 16, 1937

2,074,251

UNITED STATES PATENT OFFICE 2,074,251

ARRANGEMENT FOR THE AUTOMATIC STEERING OF MOTOR VEHICLES

August Wilhelm Braun, Vienna, Austria

Application January 8, 1936, Serial No. 58,195
In Austria January 11, 1935

12 Claims. (Cl. 180—79.1)

This invention relates to an arrangement for the automatic steering of motor vehicles and essentially comprises one or more systems of photo-electric cells, arranged on, in, underneath or in front of the vehicle and receiving their rays of light by reflection from below either directly or indirectly from the track.

One mode of carrying out the present invention is illustrated by way of example on the accompanying sheets of drawings, in which—

Figure 1:
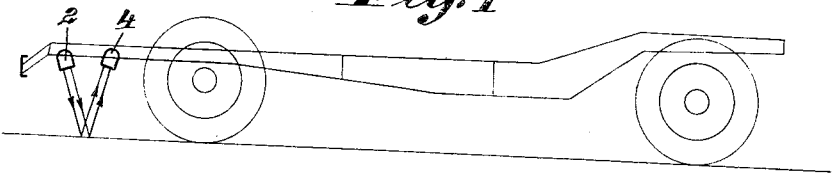
Figure 2:
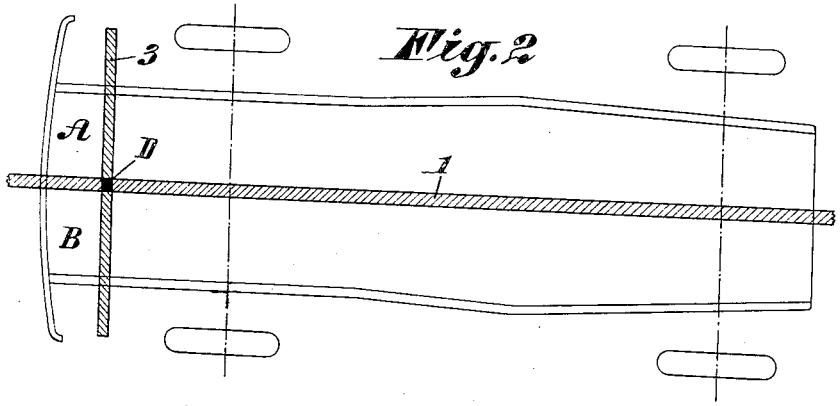
Figure 3:
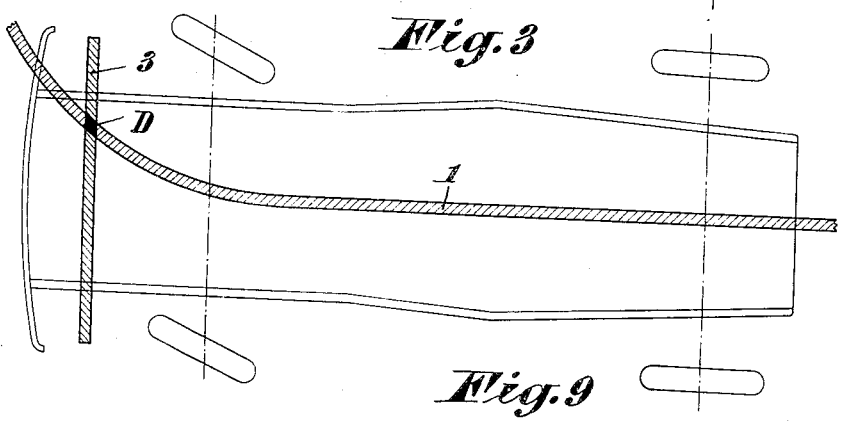
Figure 8:
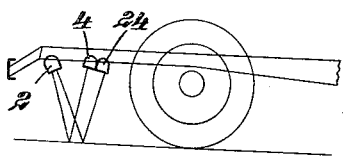
Figure 9:
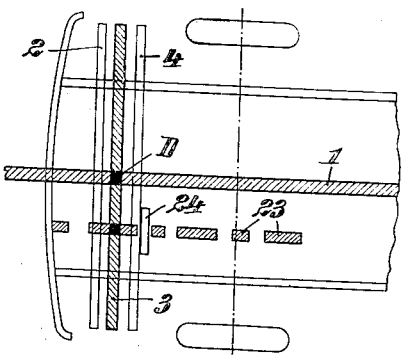

Figs. 1 and 2 show diagrammatically in elevation and in plan view respectively a construction intended for straight driving. Fig. 3 shows diagrammatically a vehicle in plan view when taking a curve. Fig. 4 shows a diagram of connections. Figs. 5 and 6 illustrate the steering mechanism of the arrangement according to the invention. Fig. 7 is a detail view. Figs. 8 and 9 show diagrammatically a modified construction in elevation and in plan view respectively.

The track is provided with a guide-line 1 for the automatic steering of the vehicle, one guide-line 1 being provided for each direction of travel. This guide-line may be of different colors or materials. However it is essential, that the reflection of the light or rays by this guide-line be variable, e. g. it becomes stronger or weaker, with respect to the reflection of the light or rays by the other surface of the track. If desired, the guide-line may be of such material or color, that also a reflection of invisible (infra-red or ultra-violet) rays may be resorted to.

Further the arrangement comprises a source of light or other rays 2, which is arranged in, underneath or in front of the chassis of the vehicle and projects the rays transversely to the direction of travel either directly or, by means of reflectors, indirectly upon the track in the shape of a broad band 3 as shown in principle in Figs. 2 and 3. These rays are reflected by the track and thus influence a system of photo-electric cells 4. At the place where the guide-line 1 traverses the band of rays 3, a maximum or minimum of light reflection will arise and thus the system of photoelectric cells 4 (Fig. 1) will be influenced by the rays and thus the same will react strongest or weakest at this differentiating place D (Figs. 2 or 3). The photo-electric cells 4 are connected with electric amplifiers 5 and electric control relays 6 in such manner, that, for instance as shown in Fig. 4, an amplifier operating a corresponding control relay is accorded to one or more cells of the groups of cells 4. In view of the current supplied to this relay and which is proportional to the photo-electric current of the cell and thus also to the influence of the light rays on said cell, the said relay controls the circuit of an electric steering motor M in such manner, that the latter is operated in accordance with the intensity of the rays of light thrown into the cell. Thereby the steering motor is operated in accordance with the position with respect to the middle line of the vehicle. 7 designates the connecting lines of the cells, 8 are the connecting lines of the relays and 9 designates the connecting lines of the motor. The current for feeding the amplifiers 5 and the relays 6 is supplied by the source of current 10. For instance as shown in Fig. 6, the control motor M may be arranged on the steering pillar and by means of a gear controls the steering mechanism of the vehicle (steering worm or the like).

The current circuits, controlled by the photo-electric cells 4, are connected for instance as shown in Fig. 4 in such manner, that, when the cells B at the left hand side of the middle line of the vehicle (Figs. 2 and 4) are functioning, the rotor of the steering motor M is rotated in the direction $b$ (Fig. 4), while the said rotor is rotated in the opposite direction of rotation $a$ (Fig. 4) in case the cells A at the right hand side of the middle line of the vehicle are acting. The current of the motor or the speed of rotation of the motor-shaft can be graded in such manner by the suitable arrangement of resistances 11 controlled by the relays 6 and if desired by short-circuiting the branches 12 of the exciting winding of the motor, that the photo-electric cells adjoining the middle line of the vehicle produce a smaller effect than the cells disposed farther away from said middle line.

This will result in that, in the event of a somewhat considerable departure from the guide-line 1, the steering arrangement effects a correspondingly greater rotation of the steering pillar and thus more quickly returns the vehicle into the correct position, than if the vehicle deviates from the guide-line to a smaller extent.

The arrangement according to the invention operates for instance in the following manner:— Solely the photo-electric cell c (Fig. 4) arranged at one side C of the middle of the vehicle is influenced by the differentiating place, as long as the longitudinal middle line of the vehicle travels exactly over the guide-line 1. This cell effects that the relays 13 and 14 are secured as described hereinafter. The steering is not influenced in any way. If the guide-line deviates from the straight direction, the differentiating place D moves into the range of one of the groups of cells A or B and the relays of this group of cells become operative in succession beginning from the middle. In this case, at first the steering motor is switched on by the middle-cell c or its relay 14. The armature circuit of the series wound motor is connected in the correct manner for the desired direction of rotation by the relays of the first cells at the right or left hand sides from the middle. The other cells effect the successive short-circuiting of the parts of the series resistance 11, whereby the speed of the motor turning moment are correspondingly increased. The speed can be further increased by the weakening of the field (parts 12) when the two last cells are functioning. When the motor vehicle has come into the proper position, even a small movement of the differentiating place to the other side (first cell of the other group) effects the reversal of the direction of rotation and thus causes the automatic return of the steering means. The reversal of the direction of rotation of the armature of the motor is effected by reversing the direction of the current in the armature, while the direction of the current in the field-winding is not changed.

Thus by this arrangement of the steering motor M, the vehicle will tend to come into a position in which the guide-line 1 of the track is disposed exactly below the middle line of the vehicle. Any deviation from this position is prevented by suitably dimensioning the control members, such as for instance the resistances in the motor-circuit or, if desired, by liquid or friction brakes.

As shown by way of example in Figs. 5 and 7 of the drawings, the steering wheel 15 of the vehicle is provided with a system of contacts 16, 17, operating in such manner, that the contacts interrupt the current supplied to the steering motor and the amplifier, if one or both hands of the driver rest on the steering wheel 15 or on its top ring 18. The automatic steering mechanism is disengaged as long as one or both hands of the driver rest on the steering wheel. However, the moment the hands are entirely removed from the steering wheel, the contacts effect the engagement of the automatic steering mechanism. In Figs. 4 and 5 19 is a relay and 20 is a small source of current for its operation.

Preferably the connection is carried out in such manner that a visible signal or an audible signal is given if all the photo-electric cells or even if only one photo-electric cell are or is inoperative. As shown at I Fig. 4, this may be done, in one way, by providing that the corresponding relay 6 is not operative if a cell is not functioning, whereby the relay-contacts 21 remain open and subsequently the relay 13 becomes operative, thereby placing in circuit an alarm device 22. However the relay 13 will act only in case the cell c does not function or is not subjected to the influence of the differentiating place D. In this way the alarm is also operative, if the guide-line is completely interrupted. Thus by this arrangement danger-signals can be given also for instance when approaching railway-crossings. For this object it is only necessary to interrupt the guide-line 1 for instance by providing a sort of Morse signals, in order to operate correspondingly a visible signal or an audible signal, because the photo-electric cells do not function in the described manner at the places of interruption, and therefore the signal device 22 is placed in operation. For instance the same result may be obtained by arranging suitable signs at the side of the guide-line 1 for example in the shape of short lines 23 as shown in Fig. 9; said short lines operating a particular system of cells 24, arranged for this special object and which is independent of the system 4. The system of cells 24 gives its own signals to the driver by means of a separate signal-circuit. In this case it is not necessary to interrupt the main guide-line 1.

The two systems of photo-electric cells 4 and 24 may be rendered operative independently of one another by making the two guide-lines (the main guide-line 1 and the auxiliary signal guide-line 23) of different colors or values of reflection or by using different color-filters in front of the photo-electric cells.

What I claim is—

1. Automatic steering mechanism for vehicles, comprising a steering device for said vehicle, a light-responsive electrical means mounted on the vehicle, a motor having a rotor operatively connected with said steering device to actuate the same, and an electrical circuit comprising a source of energy and operatively connecting said light-responsive means with said motor, whereby rays of light striking said light-responsive means will control the operation of the said motor and thereby of the steering device.

2. Automatic steering mechanism for vehicles, comprising a steering device for said vehicle, a light-responsive electrical means mounted on the vehicle, a motor having a rotor operatively connected with said steering device to actuate the same, an electrical circuit comprising a source of energy and operatively connecting said light-responsive means with said motor, and a source of radiation carried by the vehicle and adapted to project rays solely by reflection from the roadway to the light-responsive means, whereby said means will control the operation of the said motor and thereby of the steering device.

3. Automatic steering mechanism for vehicles, comprising a steering device for said vehicle, a light-responsive electrical means mounted on the vehicle, and comprising a number of photo-electric cells, a motor having a rotor operatively connected with said steering device to actuate the same, an electrical circuit comprising a source of energy and operatively connecting said light-responsive means with said motor, and a source of radiation carried by the vehicle and adapted to project rays solely by reflection from the roadway to at least one of the cells of the light-responsive means, whereby said means will control the operation of the said motor and thereby of the steering device.

4. Automatic steering mechanism for vehicles, comprising a steering device for said vehicle, a light-responsive electrical means mounted on the vehicle, and comprising a number of photo-electric cells and amplifying devices for said cells, a motor having a rotor operatively connected with said steering device to actuate the same, an electrical circuit comprising a source of energy and operatively connecting said light-responsive means with said motor through said amplifying devices, and a source of radiation carried by the vehicle and adapted to project rays solely by reflection from the roadway to at least one of the cells of the light-responsive means, whereby said means will control the operation of the said motor and thereby of the steering device.

5. Automatic steering mechanism for vehicles, comprising a steering device for said vehicle, a light-responsive electrical means mounted on the vehicle, and comprising a number of photo-electric cells, amplifying devices for said cells, and relays, a motor having a rotor operatively connected with said steering device to actuate the same, an electrical circuit comprising a source of energy and operatively connecting said light-responsive means with said motor through said amplifying devices and relays, and a source of radiation carried by the vehicle and adapted to project rays solely by reflection from the roadway to at least one of the cells of the light-responsive means, whereby said means will control the operation of the said motor and thereby of the steering device.

6. Automatic steering mechanism for vehicles, comprising a steering wheel for said vehicle, a light-responsive electrical means mounted on the vehicle, and comprising a number of photo-electric cells, a motor having a rotor operatively connected with said steering wheel to actuate the same, an electrical circuit comprising a source of energy and operatively connecting said light-responsive means with said motor, a source of radiation carried by the vehicle and adapted to project rays solely by reflection from the roadway to at least one of the cells of the light-responsive means, whereby said means will control the operation of the said motor and thereby of the steering wheel, and contacts carried by said wheel and connected to said electrical circuit, whereby said contacts may control said circuit independently of the light-responsive means.

7. Automatic steering mechanism for vehicles, comprising a steering device for said vehicle, a light-responsive electrical means mounted on the vehicle, and comprising a number of photo-electric cells, a motor having a rotor operatively connected with said steering device to actuate the same, an electrical circuit comprising a source of energy and operatively connecting said light-responsive means with said motor, and a source of radiation carried by the vehicle and adapted to project rays solely by reflection from the roadway to at least one of the cells of the light-responsive means, whereby said means will control the operation of the said motor and thereby of the steering device, an additional light-responsive means independent of the first, means for energizing said additional light-responsive means, and an alarm signal operatively connected thereto to be actuated thereby when so energized.

8. Automatic steering mechanism for vehicles, comprising a steering device for said vehicle, a plurality of independent light-responsive electrical means mounted on the vehicle, a motor having a rotor operatively connected with said steering device to actuate the same, an electrical circuit comprising a source of energy and operatively connecting one of said light-responsive means with said motor, whereby rays of light striking said light-responsive means will control the operation of the said motor and thereby of the steering device, an alarm device also carried by the vehicle and another electrical circuit operatively connecting another of said light-responsive means with said alarm device, whereby rays of light striking said last-named light-responsive means will control the operation of said alarm device.

9. The process of automatically controlling the steering of a vehicle provided with light-responsive means, and an electric circuit including a source of electrical energy and a steering motor, which process consists in causing the said source of electrical energy to project radiation to the roadway upon which the vehicle travels, selectively reflecting some of said radiant energy from the roadway to said light-responsive means, and causing said light-responsive means thereby to control the supply of energy from the said source to the motor, thus causing said motor to actuate the steering mechanism of the vehicle.

10. A process as defined in claim 9, wherein the light reflected from the roadway is modified by said roadway to produce different responses when the vehicle is over correspondingly different portions of said roadway.

11. The process defined in claim 9, wherein the light reflected from the roadway is caused to be interrupted by the roadway at desired intervals in the travel of the vehicle.

12. The process defined in claim 9, wherein the light reflected from the roadway is divided into a plurality of separate and independent portions, each acting independently upon the light-responsive means.

AUGUST WILHELM BRAUN.